United States Patent [19]

Ishida et al.

[11] 4,017,451
[45] Apr. 12, 1977

[54] PENCIL LEAD AND MANUFACTURING METHOD OF THE SAME

[75] Inventors: Nobuhiro Ishida, Yokohama; Kazuyuki Saito, Kofu, both of Japan

[73] Assignees: Mitsubishi Chemical Industries Ltd., Tokyo; Oriental Sangyo Co., Ltd., Yamanashi, both of Japan

[22] Filed: June 16, 1975

[21] Appl. No.: 587,327

[30] Foreign Application Priority Data

June 17, 1974 Japan .............................. 49-68085

[52] U.S. Cl. .................................. 260/38; 106/19; 260/833; 260/844; 264/211
[51] Int. Cl.² ......................................... C08K 3/04
[58] Field of Search ...................... 106/19; 260/38; 264/211, 176

[56] References Cited

UNITED STATES PATENTS

| | | | |
|---|---|---|---|
| 3,821,157 | 6/1974 | Muller et al. | 106/19 X |
| 3,834,910 | 9/1974 | Mukai et al. | 106/19 |
| 3,928,520 | 12/1975 | Shinomoto et al. | 106/19 X |
| 3,953,218 | 4/1976 | Pollard | 106/19 |

OTHER PUBLICATIONS

A.P.C. Application of H. Schwappacher, Ser. No. 286693, published 4-20-43.

*Primary Examiner*—Donald E. Czaja
*Assistant Examiner*—S. M. Person
*Attorney, Agent, or Firm*—Oblon, Fisher, Spivak, McClelland & Maier

[57] ABSTRACT

A pencil lead comprises an extrudate of a kneaded blend of a coloring material and a novolak resin or a derivative thereof.

7 Claims, No Drawings

PENCIL LEAD AND MANUFACTURING METHOD OF THE SAME

BACKGROUND OF THE INVENTION

1. Field of the Invention

The present invention relates to a pencil lead composition and also to an advantageous method for manufacturing such lead.

2. Description of the Prior Art

Pencil lead, for example, black lead, has heretofore been manufactured by blending a coloring material such as natural graphite or artificial graphite, with a clay binder, grinding the blend with water and kneading it, extruding the wet material so obtained into the appropriate form for a lead pencil, and after drying, baking it at elevated temperatures of about 1,000° C and further oil-immersing it. Such a method is complicated for a manufacturing process not only in that it involves a large number of steps but also because close control of the water content at the time of extrusion is required. Moreover, it is necessary to bake the flexible extrudate while maintaining it in a straight line. However, it is almost impossible to bake an endless length of lead continuously. Thus, there is an inherent limitation to the number and types of variations for such a manufacturing process.

In order to eliminate or improve upon these defects in the conventional pencil lead making process, various methods of obtaining lead without need for baking have been proposed. These methods use various kinds of thermoplastic or thermosetting synthetic resins as a binder and involve blending and kneading them with a colored material and extruding the blend through a screw type extruder. (For example, see Japanese Patent Publication Gazette Nos. 3363/1952, 2309/1967, 13368/1973, 18900/1973, 12300/1974 and 12302/1974, and Patent Public Disclosure Gazette Nos. 16214/1972 and 55017/1974.)

However, the leads obtained by these methods are significantly inferior in performance to conventional lead obtained by using clay as a binder and baking at elevated temperatures. Particularly, the H, F, HB and B classes of lead, which are in great demand, suffer from the defect that a finely shaved point is easily broken because these leads have insufficient strength.

Generally, the writing depth (or density) of lead and its strength are inversely related to one another; that is, the deeper the depth, the lower the strength. In lead blended with a resin as a binder, the strength increases directly with the amount of resin component but the depth decreases therewith. Although, in lead below 2H in depth, e.g., 3H, 4H, 5H, etc., there is no problem in practical applications with use of various synthetic resins, as described in the above-mentioned publications, the demand for pencil lead is mostly concentrated in the vicinity of the HB level. Therefore, if a lead of depth as high as HB cannot be made of high strength in a given process, the method suffers enormously from an industrial viewpoint. Consequently, it would be most desirable to have an approximately HB pencil lead of high strength which is fabricated using a synthetic resin binder.

SUMMARY OF THE INVENTION

Accordingly, it is an object of this invention to provide a pencil lead having a depth of about HB level, having satisfactorily high strength, and not requiring a baking step at elevated temperatures for its production.

This and other objects of this invention as will hereinafter become clear by the ensuing discussion have been attained by providing a pencil lead obtained by extruding a kneaded blend of a coloring material and novolak resin and/or a derivative thereof. The lead of the present invention can be particularly advantageously manufactured by blending a coloring material with novolak resin and/or a derivative thereof, kneading the blend so obtained and extruding it at a die temperature of 100° to 150° C and at an extruding pressure of from 200 to 3000 kg/cm$^2$.

DETAILED DESCRIPTION OF THE PREFERRED EMBODIMENTS

In the present invention various coloring materials can be used. For example, graphite is usually used for a black lead. The graphite used may be natural or artificial, and is desirably of a fine particle size. Scaly graphite is particularly preferred because it has good properties in the use of a brush. However, since such scaly graphite is expensive, soil graphite or artifical graphite may be appropriately mixed with it. Moreover, the graphite may be mixed with carbon black. In case of colored lead, the various conventional dyes and pigments can be used. Also, inorganic fillers such as talc, clay, calcium carbonate, and the like can be used as extenders.

A key feature of the present invention is the use of novolak resin and/or a derivative thereof alone or in combination with another ingredient. In general, a so-called phenol resin is a reaction product of a phenol, such as phenol, cresol or xylenol, with an aldehyde such as formaldehyde. It is well known that either a novolak resin or a resol resin may be obtained depending upon both the type of catalyst used in the reaction and the molar ratio of the aldehyde to the phenol. For example, in the reaction of phenol and formaldehyde, use of an acid catalyst, such as hydrochloric acid or oxalic acid, and a molar ratio of formaldehyde to phenol which is less than 1, generally produces a novolak resin. Use of an alkali catalyst, such as caustic soda, and a molar ratio of formaldehyde to phenol which is greater than 1 produces a resol resin. A resol resin sets upon heating to become a non-soluble and non-melting resin, while a novolak resin, which is thermoplastic, melts upon heating to become a sticky liquidlike substance and does not set. (However, the novolak resin does set when heated in the presence of formaldehyde, or hexamethylene-tetramine.) It is noted that the Patent Publication Gazette No. 27-3363/1952, on page 1, left column, lines 29 to 34, discloses that it is known to extrude the lead of a pencil by use of a pre-condensation product of a resin such as phenol formalin resin or urea formalin resin, as a binder and to set it by heat treatment at a relatively low temperature. Such a pre-condensation product of a phenol formalin resin obviously does not include the novolak resin used in the present invention since the prior art product is set by heating in the presence of no additives. The pencil lead prepared by thermosetting with a thermosetting phenol resin used as a binder not only possesses an inferior writing quality but also requires complicated manufacturing steps because of the necessary setting treatment after extruding.

The present invention makes use of a binder prepared from a novolak resin/or a derivative as mentioned above. Suitable derivatives of novolak resin include the novolak epoxy resin (epoxy novolak) prepared by reacting a novolak resin with epichlorohydrin in the presence of a caustic alkali, the etherified reaction product of a novolak resin with an alkyl halide in the presence of a caustic alkali, the reaction product of an epoxynovolak with an aryl halide and the like. The novolak resins and their derivatives to be used in the process of the present invention are preferably of a solidlike state and of high molecular weight greater than about 700. The process of the present invention makes use of said novolak resins or of their derivatives since they are thermoplastic without the combined use of a setting agent. Consequently, the novolak resins or their derivatives remain thermoplastic throughout the process. Therefore, all ingredients used in the process may be handled as thermoplastic substances in all steps of compounding, kneading and extruding. As a result, whenever inferior or non-standardized articles are obtained, the starting materials can be reused because all ingredients are thermoplastic.

In the process of the present invention, novolak resins and/or their derivatives can be used in combination with other thermoplastic resins. These other thermoplastic resins should preferably have an affinity for coloring agents, and the novolak resins and their derivatives. This affinity should include the ability of physical homogeneous mixing. Suitable other thermoplastic resins include, for example, styrene resins, vinyl chloride resins, vinyl acetate resins, and bisphenol epichlorohydrin derived epoxy resins, especially styrene resins such as polystyrene, and high impact polystyrene, as well as acrylonitrile-butadiene-styrene copolymer (ABS). Mixtures of these thermoplastic resins may also be used. Prior to the extruding step, lubricants, plasticizers, stabilizers, dispersion assistants and the like may be compounded with the ingredients. In particular, inclusion of a lubricant is preferred in order to improve the writing and extrusion qualities. Suitable lubricants include higher fatty acids (such as a fatty wax or stearic acid), metallic salts of a higher fatty acid (such as calcium stearate), waxes (such as paraffin wax) and amides (such as bis-stearyl amide of ethylene diamine).

The appropriate compounding ratio of ingredients in the process of the present invention varies with the kinds of materials used and the type of pencil lead desired with no strict general rule. However, a suitable composition for preparing a pencil lead of depth in the range of 2B –9H may be selected from the following range:

resin ingredient: 5–50% by weight, especially 5–30% by weight
coloring agent ingredient: 50–80% by weight
lubricant ingredient: 0–20% by weight, especially 5–15% by weight Additionally, the optional thermoplastic resins mentioned above may be present in from 0–15% by weight, especially 2–15% by weight. In particular, a suitable composition for production of the highly desirable pencil lead of depth HB or thereabout may be selected from the following range:
resin ingredient: 15–20% by weight
coloring agent ingredient: 65–75% by weight
lubricant ingredient: 5–20% by weight In compounding the ingredients in the process of preparing a pencil lead according to the present invention, the resin ingredient should preferably by previously atomized and should be blended while in the powdered form. However, some resins, such as ABS, are difficult to atomize. In this case, blending may be performed by use of a conventional ribbon blender, a V-type blender or a Henschel mixer. Additionally, the ingredients of the present invention should preferably be fully kneaded before being extruded. In particular, when a great quantity of coloring agent is used, unsatisfactory kneading resulting in ensuing poor dispersion may cause the breaking of the pencil lead upon extrusion and unevenness in the quality of pencil lead produced. Preferred kneading devices include a mixing roll, a kneader, a Banbary, or a screw such as a multiple screw or a single screw. Regarding the single screw, because of the small bulk density of the material, it is necessary to choose one which easily effects intrusion. The kneading temperature is not critical and may be chosen according to the kinds of material and the compounding ratio employed. It usually is in the range of about 150° C – 170° C. A temperature higher than 170° C may cause the partial gelation of the novolak resin due to the pressure of the oxygen in the air. Any powder resulting from the kneading should be formed into a pellet by any adequate means.

Extrusion of the pencil lead of the present invention may be performed by use of a plunger type extruding machine or screw type extruding machine, preferably in a continuous production. The extruding temperature is preferred to be lower than 170° C in order to avoid gelation of the novolak resin. In particular, the temperature of the nozzle is preferred to be lower than 150° C. In general, a lower nozzle or die temperature and a high extruding pressure will yield a good pencil lead of great bending strength. Under these conditions, the lead material should be molded under high extruding pressure while sliding through the nozzle, overcoming the friction between the nozzle wall and itself. Therefore, an especially preferred extruding condition involves a temperature of 100° C to 150° C, preferably 110° to 140° C, and an extruding pressure (pressure at the nozzle inlet) of 200 to 3000 kg/cm$^2$ preferably 300 to 1000 kg/cm$^2$. The extruded lead material from the extruding machine is cooled by any adequate cooling means. Suitable means include water cooling during the lead's introducion into a guide roll, equipped with a water sprinkling facility, where it sets producing a pencil lead with no flexibility. It should be emphasized that continuous extrusion can produce continuously a pencil lead of infinite length.

The pencil lead prepared by the process of the present invention has a superior writing quality, far superior to that of the so-called clay lead prepared with a conventional clay binder. It eliminates the disadvantage of soiling the hand that touches the pencil lead. Furthermore, the pencil lead of this invention has a strength higher than that of a pencil lead prepared with other thermoplastic resins eliminating the disadvantages of the pointed end breaking. Additionally, it is to be stressed that the process for preparing a pencil lead according to the present invention involves steps simpler than those of the prior art process for preparing a clay lead. Moreover, it has the attendant advantages of an easily controlled operation, a good operational environment, the capability for easily and continuously producing a pencil lead of infinite length. Thus, it allows new concepts to be used in pencil lead manufacturing. In particular, if the pencil lead composition of the present invention is employed in the production of pencils having pencil rods of synthetic materials (such as lowly expanded foamed synthetic resins), the continuous production of the pencil by combined extrusion of both the rod material and the lead material will be feasible.

Having generally described the invention, a more complete understanding can be obtained by reference to certain specific examples, which are included for purposes of illustration only and are not intended to be limiting unless otherwise specified.

EXAMPLE 1

A commercial novolak resin (average molecular weight of 900) was atomized in an atomizer. 18 parts by weight of the resulting novolak powder were added to 12 parts by weight of calcium stearate and 70 parts by weight of graphite (CSP made by Japan Graphite Company) and the mixture was blended by use of a Henschel mixer.

The resulting mixture was kneaded in a mixing roll at a roll temperature of 150°–160° C for 15 minutes. The ensuing sheet was roughly pulverized in the form of cubes of dimensions of 2–3 mm and used as the extruding material.

This material was extruded by use of an extruding machine having an aperture diameter of 3 mm and a die of diameter of 2.2 mm, under the extruding pressure of 400 Kg/cm$^2$, at the extruding rate of 3 Kg/hr, and at the temperatures described below. The resulting product was introduced to a guide roll and cooled by water.

temperature at cylinder 1 : 130° C.
temperature at cylinder 2 : 150° C.
temperature at the die : 120° C.

The resulting pencil lead had a softness of HB degree and a bending strength of 7,000 g/mm$^2$, far surpassing the bending strength of 5,000 g/mm$^2$ stipulated in JIS-S 6005. The pencil lead suffered from no problem of its pointed end breaking and had an excellent writing quality.

EXAMPLES 2–5

Pencil leads were prepared by extrusion as in Example 1, with varying composition ratios as shown in the following table where the properties of the resulting pencil leads are also shown.

The novolak resins used were the same as that used in Example 1. Aralide ECN-1299 the tradename of an article made by Ciba Geigi Company (with a molecular weight of 1270) was used as the novolak-type epoxy resin. TFX-210 made by Mitsubishi Monsanto Chemical Company, was used as the ABS. Blending of the ABS was performed as follows. It was heated to a temperature in the vicinity of its softening point, wound around a roll, and kneaded while the powdered blends were slowly added to it.

As can be seen from the table, the pencil leads prepared in Examples 2–5 according to the present invention have excellent qualities. In particular, these pencil leads have a greater bending strength than that of the control Example where ABS alone was used as a binder, and did not suffer from breakage of their pointed ends.

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A pencil lead comprising an extrudate of a kneaded blend of a coloring material and a novolak resin or a novolak epoxy resin.

2. The pencil lead of claim 1 wherein the kneaded blend comprises (1) 50 to 80% by weight of a coloring material, (2) 5 to 50% by weight of said novolak or novolak epoxy resin and (3) 5 to 20% by weight of a lubricant ingredient.

3. The pencil lead of claim 2 wherein the kneaded blend additionally comprises 2 to 50% by weight of a thermoplastic resin selected from the group consisting of styrene resins, vinyl chloride resins, vinylacetate resins and bisphenol epichlorohydrine derived epoxy resin.

4. The pencil lead of claim 2 wherein the kneaded blend comprises (1) 50 to 80% by weight of a coloring material, (2) 5 to 30% by weight of said novolak or novolak epoxy resin, (3) 5 to 15% by weight of a lubricant ingredient and (4) 2 to 15% by weight of a thermoplastic resin selected from the group consisting of styrene resins, vinylchloride resins, vinylacetate resin and bisphenol epichlorohydrine derived epoxy resin.

|  |  | Example 2 | Example 3 | Example 4 | Example 5 | Control Example |
|---|---|---|---|---|---|---|
| Composition ratio (wt.%) | Novolak resin | 25 | 10 | 14 | — | — |
|  | Novolak-type epoxy resin | — | — | — | 10 | — |
|  | ABS | — | 10 | 6 | 10 | 20 |
|  | Calcium Stearate | 10 | 10 | 10 | 10 | 15 |
|  | Graphite (CSP) | 65 | 70 | 70 | 70 | 65 |
| Properties of pencil lead | Softness (degree) | 2H | HB | H | H | HB |
|  | Bending Strength (g/mm$^2$) | 8800 | 7600 | 9200 | 8300 | 5800 |
|  | Writing quality | Excellent | Excellent | Excellent | Excellent | Excellent |
|  | Breakage of the pointed end | None | None | None | None | None |

5. The pencil lead of claim 1 wherein said novolak or novolak epoxy resin is in the solid state.

6. The pencil lead of claim 1 wherein said coloring material is natural or artificial graphite.

7. A process for manufacturing a pencil lead characterized by blending a coloring material with a novolak resin or derivative thereof and kneading, and extruding the resulting blend under a die temperature of 100° to 150° C and an extrusion pressure of 200 to 3,000 kg/cm$^2$.

* * * * *